United States Patent
Neville et al.

(10) Patent No.: US 12,447,620 B2
(45) Date of Patent: Oct. 21, 2025

(54) METHODS AND APPARATUS FOR CONTROLLING A GRIPPER OF A ROBOTIC DEVICE

(71) Applicant: Boston Dynamics, Inc., Waltham, MA (US)

(72) Inventors: Neil Neville, Waltham, MA (US); Kyle Edelberg, Claremont, CA (US); Scott Gilroy, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 124 days.

(21) Appl. No.: 18/545,148

(22) Filed: Dec. 19, 2023

(65) Prior Publication Data

US 2024/0217104 A1 Jul. 4, 2024

Related U.S. Application Data

(60) Provisional application No. 63/434,507, filed on Dec. 22, 2022.

(51) Int. Cl.
  *B25J 9/16* (2006.01)
  *B25J 15/06* (2006.01)

(52) U.S. Cl.
  CPC ......... *B25J 9/1669* (2013.01); *B25J 15/0616* (2013.01)

(58) Field of Classification Search
  CPC ...... B25J 9/1669; B25J 15/0616; B25J 5/007; B25J 13/085; B25J 15/0052; B25J 19/02; B25J 9/1612; G05B 2219/39557; G05B 2219/39558
  See application file for complete search history.

(56) References Cited

U.S. PATENT DOCUMENTS

| | | | |
|---|---|---|---|
| 9,190,554 B2 * | 11/2015 | Schmid | H10F 77/484 |
| 10,766,149 B2 | 9/2020 | Marchese et al. | |
| 10,919,151 B1 | 2/2021 | Marchese et al. | |
| 2006/0182607 A1 | 8/2006 | Clark et al. | |
| 2014/0295611 A1 * | 10/2014 | Schmid | H10F 71/137 29/745 |
| 2022/0371189 A1 | 11/2022 | Saunders et al. | |
| 2024/0217104 A1 * | 7/2024 | Neville | B25J 15/0616 |

FOREIGN PATENT DOCUMENTS

| | | |
|---|---|---|
| WO | 2016010968 A1 | 1/2016 |
| WO | 2022204027 A1 | 9/2022 |

OTHER PUBLICATIONS

International Search Report and Written Opinion of the International Searching Authority for Application No. PCT/US2023/085076, dated Apr. 11, 2024, 18 pages.

* cited by examiner

*Primary Examiner* — Bhavesh V Amin
(74) *Attorney, Agent, or Firm* — PIERCE ATWOOD LLP

(57) ABSTRACT

Methods and apparatus for controlling a robotic gripper of a robotic device are provided. The method includes activating a plurality of vacuum assemblies of the robotic gripper to grasp one or more objects, disabling one or more of the plurality of vacuum assemblies having a seal quality with the one or more objects that is less than a first threshold, assigning a score to each of the one or more disabled vacuum assemblies, reactivating the one or more disabled vacuum assemblies in an order based, at least in part, on the assigned scores, and grasping the one or more objects with the robotic gripper when a grasp quality of the robotic gripper is higher than a second threshold.

20 Claims, 14 Drawing Sheets

METHODS AND APPARATUS FOR CONTROLLING A GRIPPER OF A ROBOTIC DEVICE

CROSS-REFERENCE TO RELATED APPLICATIONS

This application claims the benefit under 35 U.S.C. § 119(e) to U.S. Provisional Patent Application No. 63/434,507, filed Dec. 22, 2023, and titled, "METHODS AND APPARATUS FOR CONTROLLING A GRIPPER OF A ROBOTIC DEVICE," the entire contents of which is incorporated by reference herein.

FIELD OF THE INVENTION

This disclosure relates to techniques for controlling a gripper of a robotic device.

BACKGROUND

A robot is generally defined as a reprogrammable and multifunctional manipulator designed to move material, parts, tools, and/or specialized devices (e.g., via variable programmed motions) for performing tasks. Robots may include manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

During robotic pick-and-place tasks in logistics scenarios (e.g., depalletizing, truck unloading, order building, etc.), a firm grasp of the object being manipulated is often desirable. For a robotic manipulator with a vacuum-based gripper, grasp quality may be related to the number of vacuum assemblies of the gripper that are able to form a good seal with the object being manipulated. A high-quality grasp may be enabled by engaging a large number of vacuum assemblies with the object at certain times and/or deactivating vacuum assemblies that fail to make a good seal with the object at certain times. In some scenarios, a vacuum assembly may initially fail to make a good seal with the object and may be deactivated, but may later be capable of making a good seal (or better seal) if it were reactivated (e.g., due to changing conditions during a grasp). In some embodiments described herein individual vacuum assemblies of a vacuum-based gripper are controlled in an intelligent manner to facilitate obtaining a secure grasp on one or more objects prior to and/or during manipulation of the object.

In one aspect, the invention features a method. The method includes activating a plurality of vacuum assemblies of a robotic gripper to grasp one or more objects, disabling one or more of the plurality of vacuum assemblies having a seal quality with the one or more objects that is less than a first threshold, assigning a score to each of the one or more disabled vacuum assemblies, reactivating the one or more disabled vacuum assemblies in an order based, at least in part, on the assigned scores, and grasping the one or more objects with the robotic gripper when a grasp quality of the robotic gripper is higher than a second threshold.

In some embodiments, the method further includes receiving mask information associating different vacuum assemblies of the robotic gripper to different objects to be grasped, and activating the plurality of vacuum assemblies comprises activating the plurality of vacuum assemblies based, at least in part, on the mask information.

In some embodiments, the one or more objects includes a first object and a second object, and the mask information associates a first set of vacuum assemblies with the first object and a second set of vacuum assemblies with the second object. The method may further include releasing the first object by selectively deactivating the vacuum assemblies in the first set of vacuum assemblies, waiting for an amount of time, and releasing the second object by selectively deactivating the vacuum assemblies in the second set of vacuum assemblies.

In some embodiments, assigning a score to each of the one or more disabled vacuum assemblies comprises assigning a score based, at least in part, on a location of the vacuum assembly in the robotic gripper. In some embodiments, assigning a score to each of the one or more disabled vacuum assemblies comprises assigning a score based, at least in part, on a number of neighboring active vacuum assemblies. In some embodiments, assigning a score to each of the one or more disabled vacuum assemblies comprises assigning a score based, at least in part, on whether the vacuum assembly is located at an edge of the robotic gripper. In some embodiments, assigning a score to each of the one or more disabled vacuum assemblies comprises assigning a score based, at least in part, on a number of retry attempts for the vacuum assembly.

In some embodiments, the method further includes receiving force information associated with the robotic gripper, and releasing the one or more objects in response to determining that the force information is greater than a third threshold. In some embodiments, the force information includes radial force information experienced by a wrist assembly coupled to the robotic gripper. In some embodiments, the third threshold is 400 Newtons.

In some embodiments, the method further includes determining that a first set of vacuum assemblies are non-functional, wherein the first set includes one or more vacuum assemblies, and reactivating the one or more disabled vacuum assemblies is performed only for vacuum assemblies not included in the first set. In some embodiments, the method further includes displaying on a user interface, an indication of the vacuum assemblies included in the first set. In some embodiments, determining that a first set of vacuum assemblies are non-functional comprises activating a first vacuum assembly of the plurality of vacuum assemblies, measuring a pressure level within the first vacuum assembly when activated, and including the first vacuum assembly in the first set when the measured pressure level is less than a third threshold.

In one aspect the invention features a controller for a robotic gripper. The controller includes at least one computer processor programmed to activate a plurality of vacuum assemblies of a robotic gripper to grasp one or more objects, disable one or more of the plurality of vacuum assemblies having a seal quality with the one or more objects that is less than a first threshold, assign a score to each of the one or more disabled vacuum assemblies, reactivate the one or more disabled vacuum assemblies in an order based, at least in part, on the assigned scores, and grasp the one or more objects with the robotic gripper when a grasp quality of the robotic gripper is higher than a second threshold.

In some embodiments, the at least one computer processor is further programmed to receive mask information associating different vacuum assemblies of the robotic gripper to different objects to be grasped, and activating the plurality of vacuum assemblies comprises activating the plurality of vacuum assemblies based, at least in part, on the mask information.

In some embodiments, the one or more objects includes a first object and a second object, and the mask information associates a first set of vacuum assemblies with the first object and a second set of vacuum assemblies with the second object. The at least one computer processor may be further programmed to release the first object by selectively deactivating the vacuum assemblies in the first set of vacuum assemblies, wait for an amount of time, and release the second object by selectively deactivating the vacuum assemblies in the second set of vacuum assemblies.

In some embodiments, assigning a score to each of the one or more disabled vacuum assemblies comprises assigning a score based, at least in part, on a location of the vacuum assembly in the robotic gripper. In some embodiments, assigning a score to each of the one or more disabled vacuum assemblies comprises assigning a score based, at least in part, on a number of neighboring active vacuum assemblies. In some embodiments, assigning a score to each of the one or more disabled vacuum assemblies comprises assigning a score based, at least in part, on whether the vacuum assembly is located at an edge of the robotic gripper. In some embodiments, assigning a score to each of the one or more disabled vacuum assemblies comprises assigning a score based, at least in part, on a number of retry attempts for the vacuum assembly.

In some embodiments, the at least one computer processor is further programmed to receive force information associated with the robotic gripper, and release the one or more objects in response to determining that the force information is greater than a third threshold. In some embodiments, the force information includes radial force information experienced by a wrist assembly coupled to the robotic gripper. In some embodiments, the third threshold is 400 Newtons.

In some embodiments, the at least one computer processor is further programmed to determine that a first set of vacuum assemblies are non-functional, wherein the first set includes one or more vacuum assemblies, and reactivating the one or more disabled vacuum assemblies is performed only for vacuum assemblies not included in the first set. In some embodiments, the at least one computer processor is further programmed to display on a user interface, an indication of the vacuum assemblies included in the first set. In some embodiments, determining that a first set of vacuum assemblies are non-functional comprises activating a first vacuum assembly of the plurality of vacuum assemblies, measuring a pressure level within the first vacuum assembly when activated, and including the first vacuum assembly in the first set when the measured pressure level is less than a third threshold.

In one aspect, the invention features a mobile robotic device. The mobile robotic device includes a robotic gripper comprising a plurality of vacuum assemblies and at least one pressure sensor associated with each vacuum assembly of the plurality of vacuum assemblies, and at least one computer processor. The at least one computer processor is programmed to activate the plurality of vacuum assemblies of the robotic gripper to grasp one or more objects, disable one or more of the plurality of vacuum assemblies having a seal quality with the one or more objects that is less than a first threshold, assign a score to each of the one or more disabled vacuum assemblies, reactivate the one or more disabled vacuum assemblies in an order based, at least in part, on the assigned scores, and grasp the one or more objects with the robotic gripper when a grasp quality of the robotic gripper is higher than a second threshold.

In some embodiments, the at least one computer processor is further programmed to receive mask information associating different vacuum assemblies of the robotic gripper to different objects to be grasped, and activating the plurality of vacuum assemblies comprises activating the plurality of vacuum assemblies based, at least in part, on the mask information.

In some embodiments, the one or more objects includes a first object and a second object, and the mask information associates a first set of vacuum assemblies with the first object and a second set of vacuum assemblies with the second object. The at least one computer processor may be further programmed to release the first object by selectively deactivating the vacuum assemblies in the first set of vacuum assemblies, wait for an amount of time, and release the second object by selectively deactivating the vacuum assemblies in the second set of vacuum assemblies.

In some embodiments, assigning a score to each of the one or more disabled vacuum assemblies comprises assigning a score based, at least in part, on a location of the vacuum assembly in the robotic gripper. In some embodiments, assigning a score to each of the one or more disabled vacuum assemblies comprises assigning a score based, at least in part, on a number of neighboring active vacuum assemblies. In some embodiments, assigning a score to each of the one or more disabled vacuum assemblies comprises assigning a score based, at least in part, on whether the vacuum assembly is located at an edge of the robotic gripper. In some embodiments, assigning a score to each of the one or more disabled vacuum assemblies comprises assigning a score based, at least in part, on a number of retry attempts for the vacuum assembly.

In some embodiments, the mobile robotic device further includes a force sensor coupled to the robotic gripper, and the at least one computer processor is further programmed to receive force information from the force sensor, and release the one or more objects in response to determining that the force information is greater than a third threshold. In some embodiments, the force information includes radial force information experienced by a wrist assembly coupled to the robotic gripper. In some embodiments, the third threshold is 400 Newtons.

In some embodiments, the at least one computer processor is further programmed to determine that a first set of vacuum assemblies are non-functional, wherein the first set includes one or more vacuum assemblies, and reactivating the one or more disabled vacuum assemblies is performed only for vacuum assemblies not included in the first set. In some embodiments, the mobile robotic device further includes a user interface, and the at least one computer processor is further programmed to display on the user interface, an indication of the vacuum assemblies included in the first set. In some embodiments, determining that a first set of vacuum assemblies are non-functional comprises activating a first vacuum assembly of the plurality of vacuum assemblies, determining, using the pressure sensor associated with the first vacuum assembly, a pressure level within the first vacuum assembly when activated, and including the first vacuum assembly in the first set when the measured pressure level is less than a third threshold.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

DETAILED DESCRIPTION

Figure 1A:
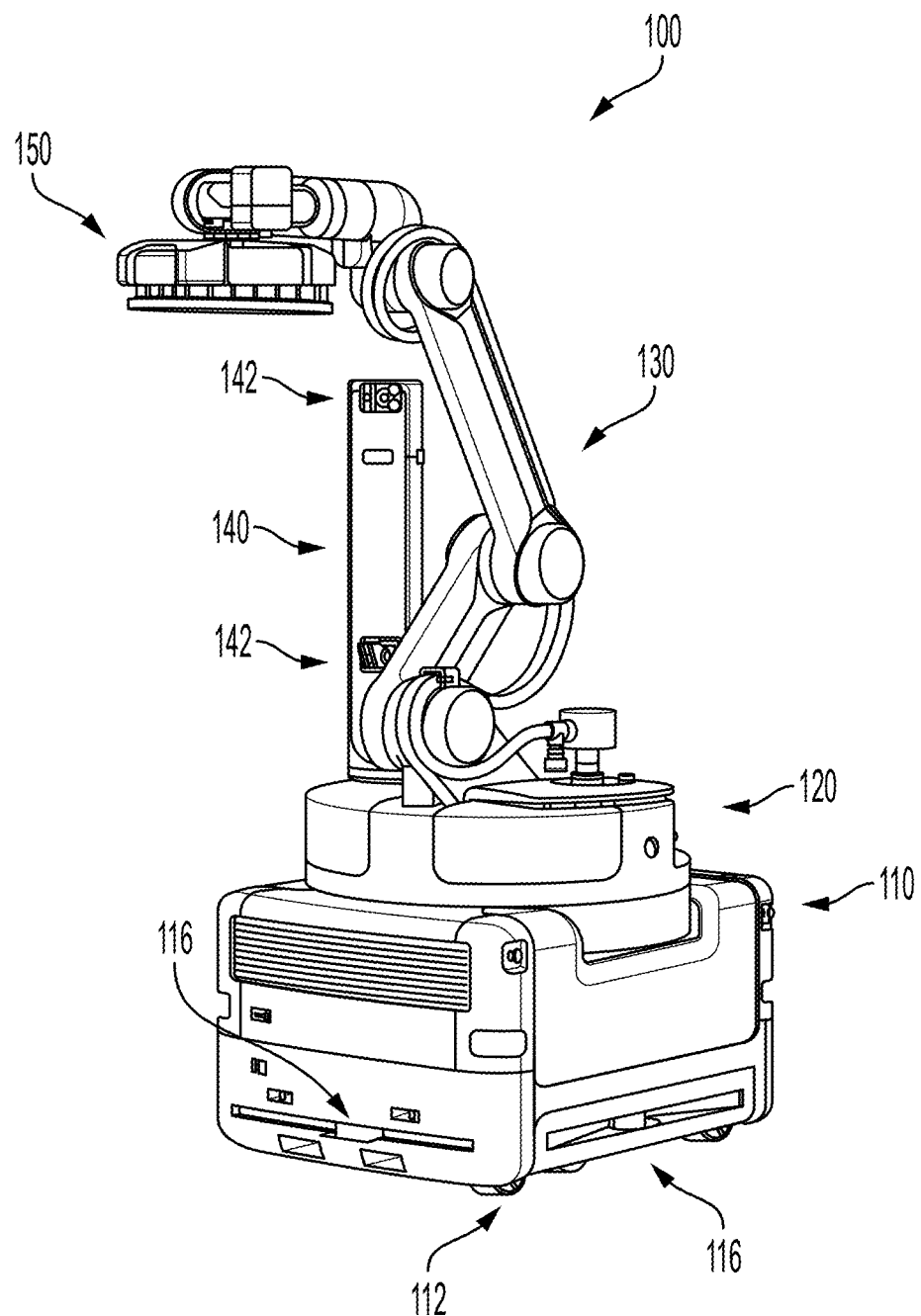
FIGS. 1A and 1B are perspective views of a robot, according to an illustrative embodiment of the invention.

Suction-based grippers for robotic devices often include a large number of vacuum assemblies designed to engage with an object to grasp the object. Independent control of the state of individual vacuum assemblies of the gripper provides for a highly configurable grasping system in which various numbers, locations and/or type of vacuum assemblies in the gripper can be activated or deactivated to grasp objects having a wide range of shapes, sizes and weights. Some embodiments of the present disclosure relate to techniques for controlling activation, reactivation, and/or deactivation of individual vacuum assemblies of a robotic gripper to optimally grasp or release one or more objects using the gripper.

Robots can be configured to perform a number of tasks in an environment in which they are placed. Exemplary tasks may include interacting with objects and/or elements of the environment. Notably, robots are becoming popular in warehouse and logistics operations. Before robots were introduced to such spaces, many operations were performed manually. For example, a person might manually unload boxes from a truck onto one end of a conveyor belt, and a second person at the opposite end of the conveyor belt might organize those boxes onto a pallet. The pallet might then be picked up by a forklift operated by a third person, who might drive to a storage area of the warehouse and drop the pallet for a fourth person to remove the individual boxes from the pallet and place them on shelves in a storage area. Some robotic solutions have been developed to automate many of these functions. Such robots may either be specialist robots (i.e., designed to perform a single task or a small number of related tasks) or generalist robots (i.e., designed to perform a wide variety of tasks). To date, both specialist and generalist warehouse robots have been associated with significant limitations.

For example, because a specialist robot may be designed to perform a single task (e.g., unloading boxes from a truck onto a conveyor belt), while such specialized robots may be efficient at performing their designated task, they may be unable to perform other related tasks. As a result, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, while a generalist robot may be designed to perform a wide variety of tasks (e.g., unloading, palletizing, transporting, depalletizing, and/or storing), such generalist robots may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible.

Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task.

In such systems, the mobile base and the manipulator may be regarded as effectively two separate robots that have been joined together. Accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while certain limitations arise from an engineering perspective, additional limitations must be imposed to comply with safety regulations. For example, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not threaten the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, a highly integrated mobile manipulator robot with system-level mechanical design and holistic control strategies between the manipulator and the mobile base may provide certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
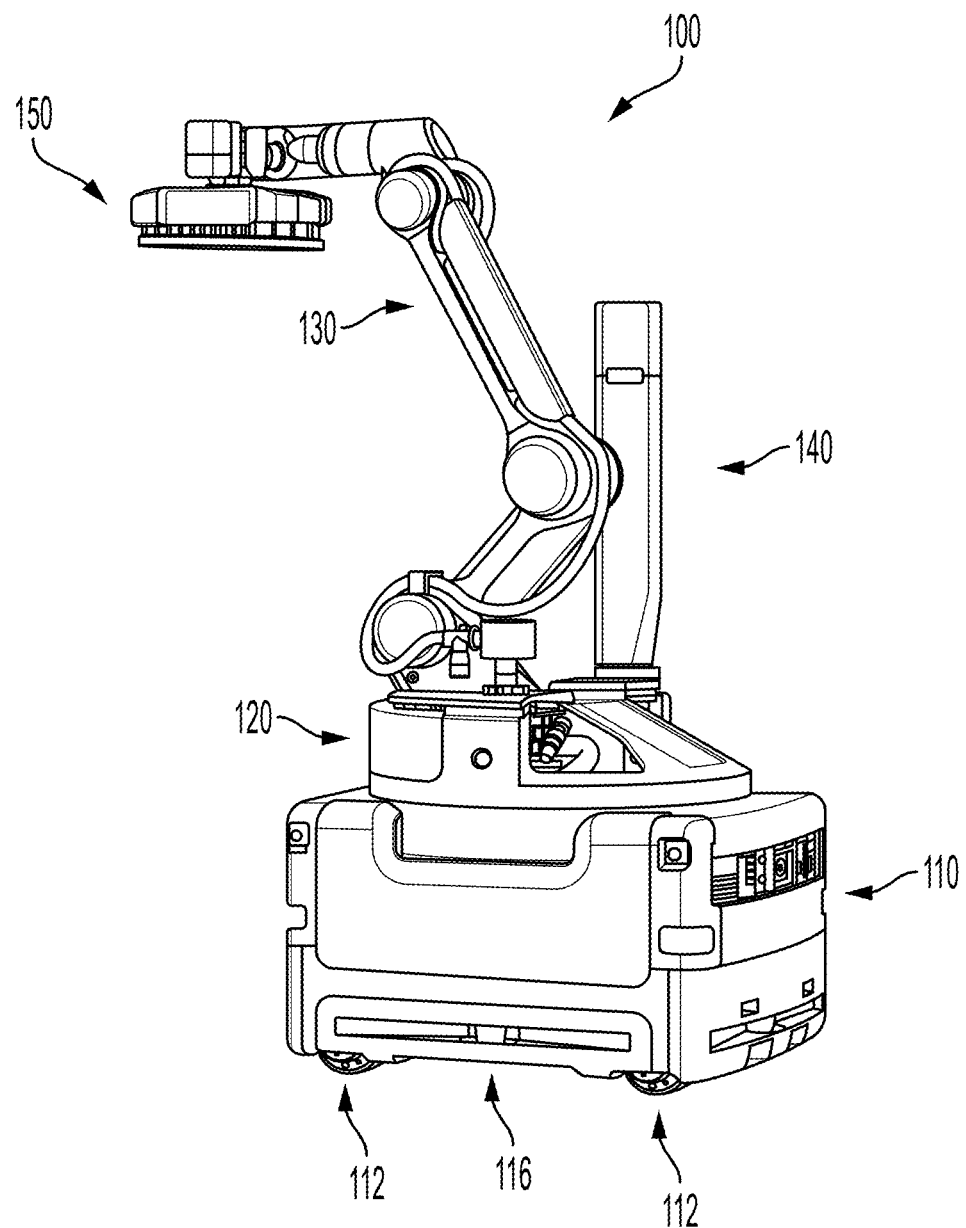

FIGS. 1A and 1B are perspective views of a robot 100, according to an illustrative embodiment of the invention. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
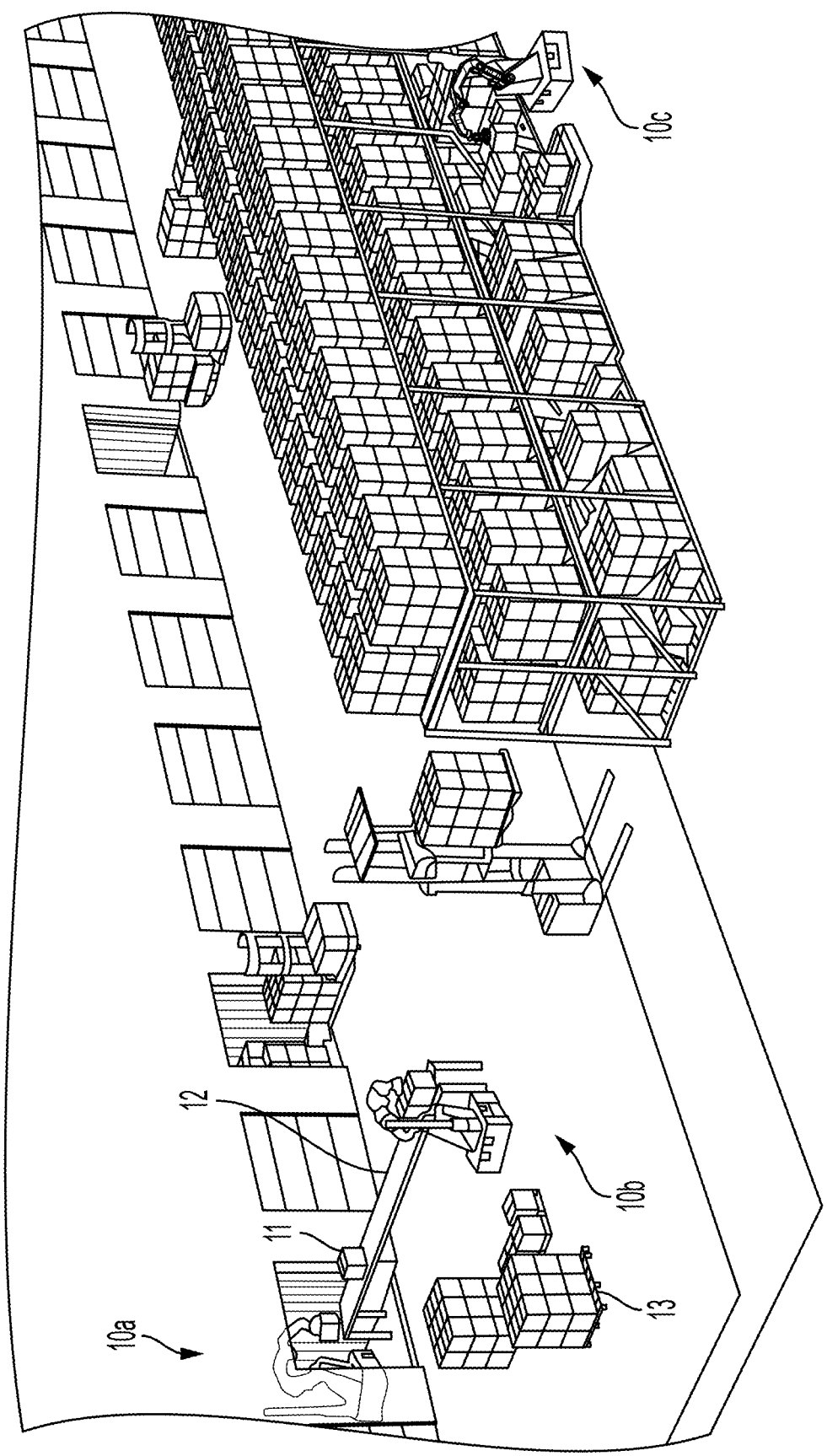
FIG. 2A depicts robots performing different tasks within a warehouse environment, according to an illustrative embodiment of the invention.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). The robots 10a, 10b, and 10c can be different instances of the same robot or similar robots. Accordingly, the robots described herein may be understood as specialized multi-purpose robots, in that they are designed to perform specific tasks accurately and efficiently, but are not limited to only one or a small number of tasks.

Figure 2B:
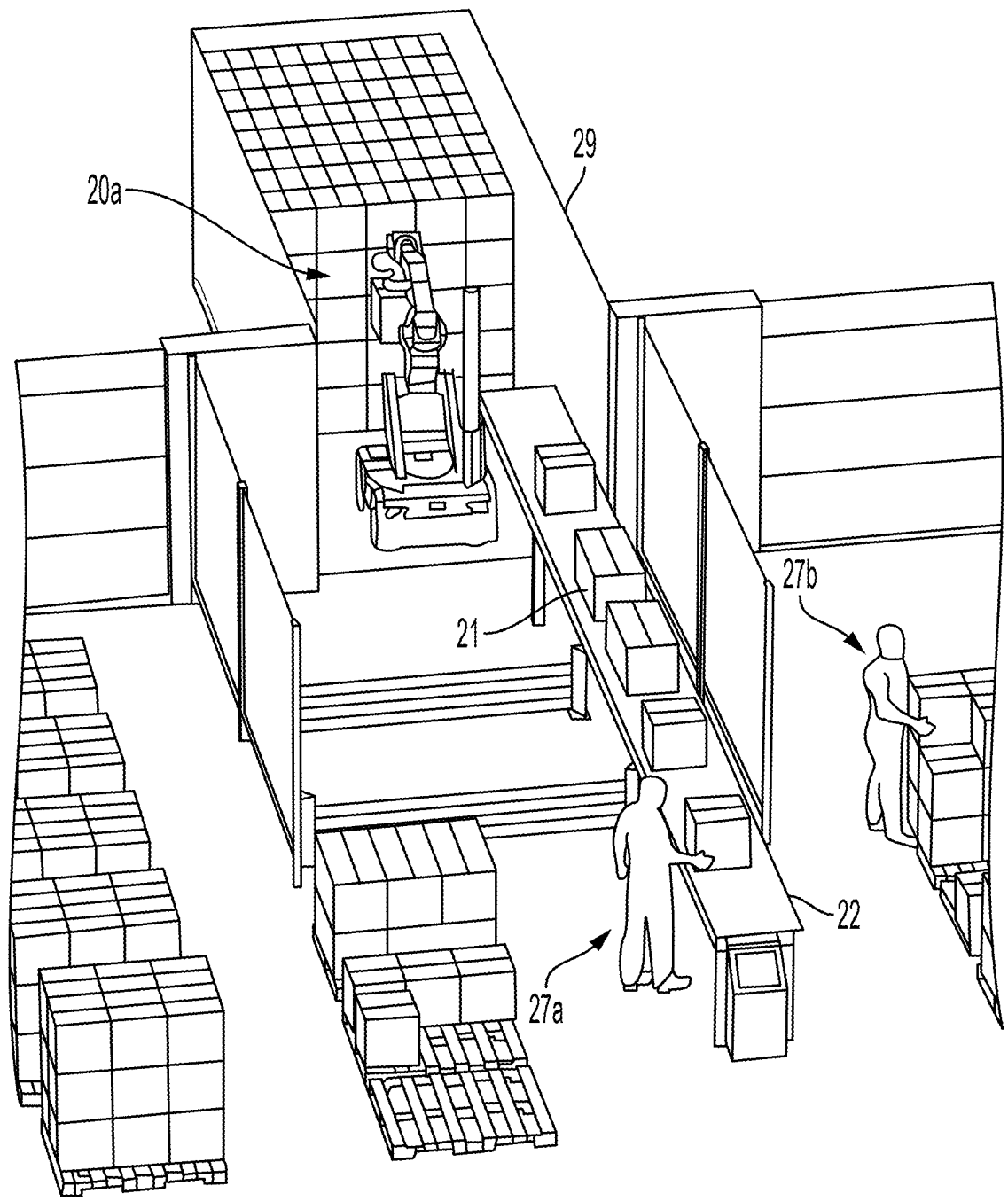
FIG. 2B depicts a robot unloading boxes from a truck and placing them on a conveyor belt, according to an illustrative embodiment of the invention.

FIG. 2B depicts a robot 20a unloading boxes 21 from a truck 29 and placing them on a conveyor belt 22. In this box picking application (as well as in other box picking applications), the robot 20a repetitiously picks a box, rotates, places the box, and rotates back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B.

During operation, the perception mast of robot 20a (analogous to the perception mast 140 of robot 100 of FIGS. 1A and 1B) may be configured to rotate independently of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety field around the robot (e.g., into which humans are prevented from entering and/or which are associated with other safety controls, as explained in greater detail below).

Figure 2C:
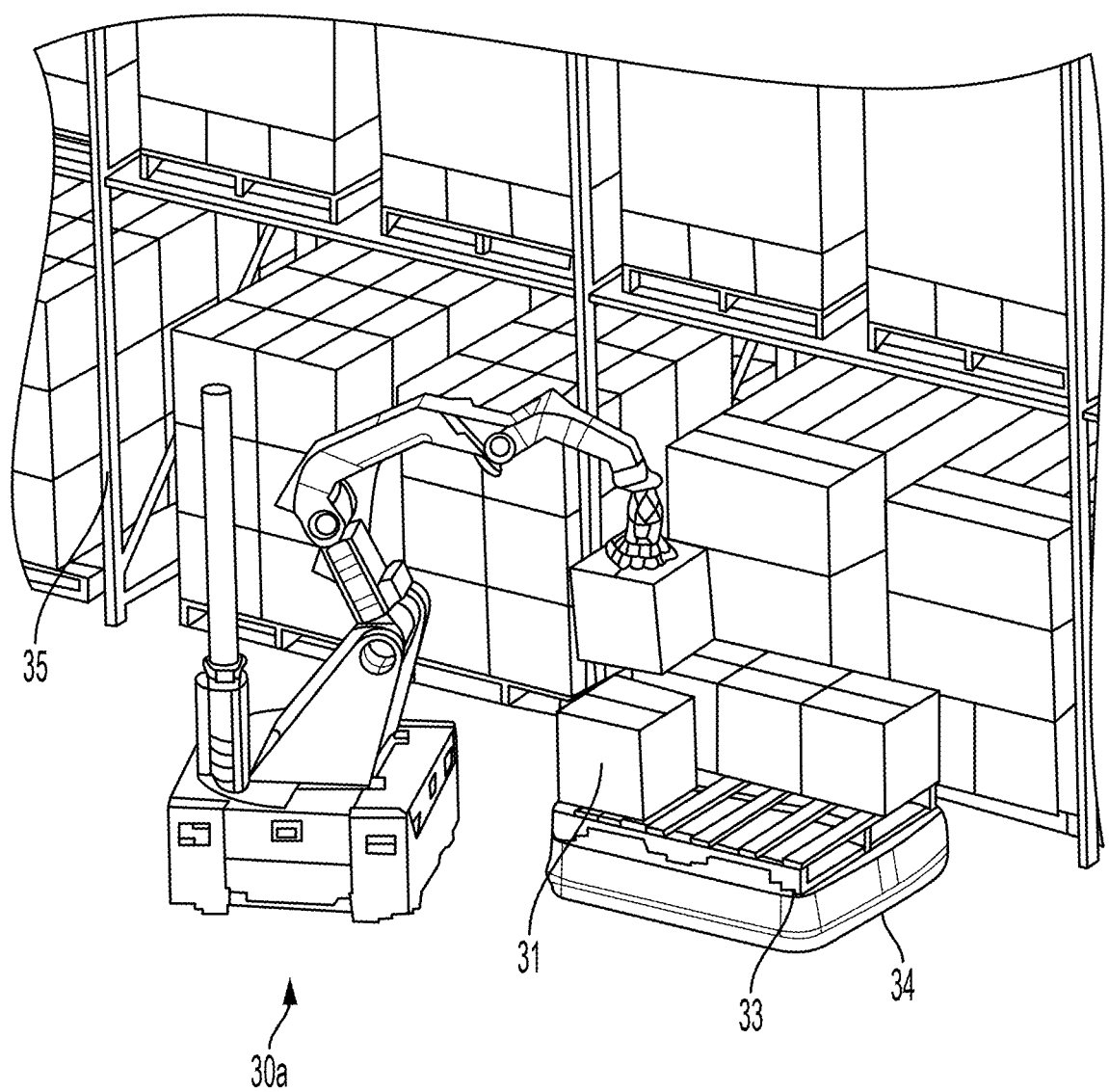
FIG. 2C depicts a robot performing an order building task in which the robot places boxes onto a pallet, according to an illustrative embodiment of the invention.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

The tasks depicted in FIGS. 2A-2C are only a few examples of applications in which an integrated mobile manipulator robot may be used, and the present disclosure is not limited to robots configured to perform only these specific tasks. For example, the robots described herein may be suited to perform tasks including, but not limited to: removing objects from a truck or container; placing objects on a conveyor belt; removing objects from a conveyor belt; organizing objects into a stack; organizing objects on a pallet; placing objects on a shelf; organizing objects on a shelf; removing objects from a shelf; picking objects from the top (e.g., performing a "top pick"); picking objects from a side (e.g., performing a "face pick"); coordinating with other mobile manipulator robots; coordinating with other warehouse robots (e.g., coordinating with AMRs); coordinating with humans; and many other tasks.

Example Robotic Arm

Figure 3:
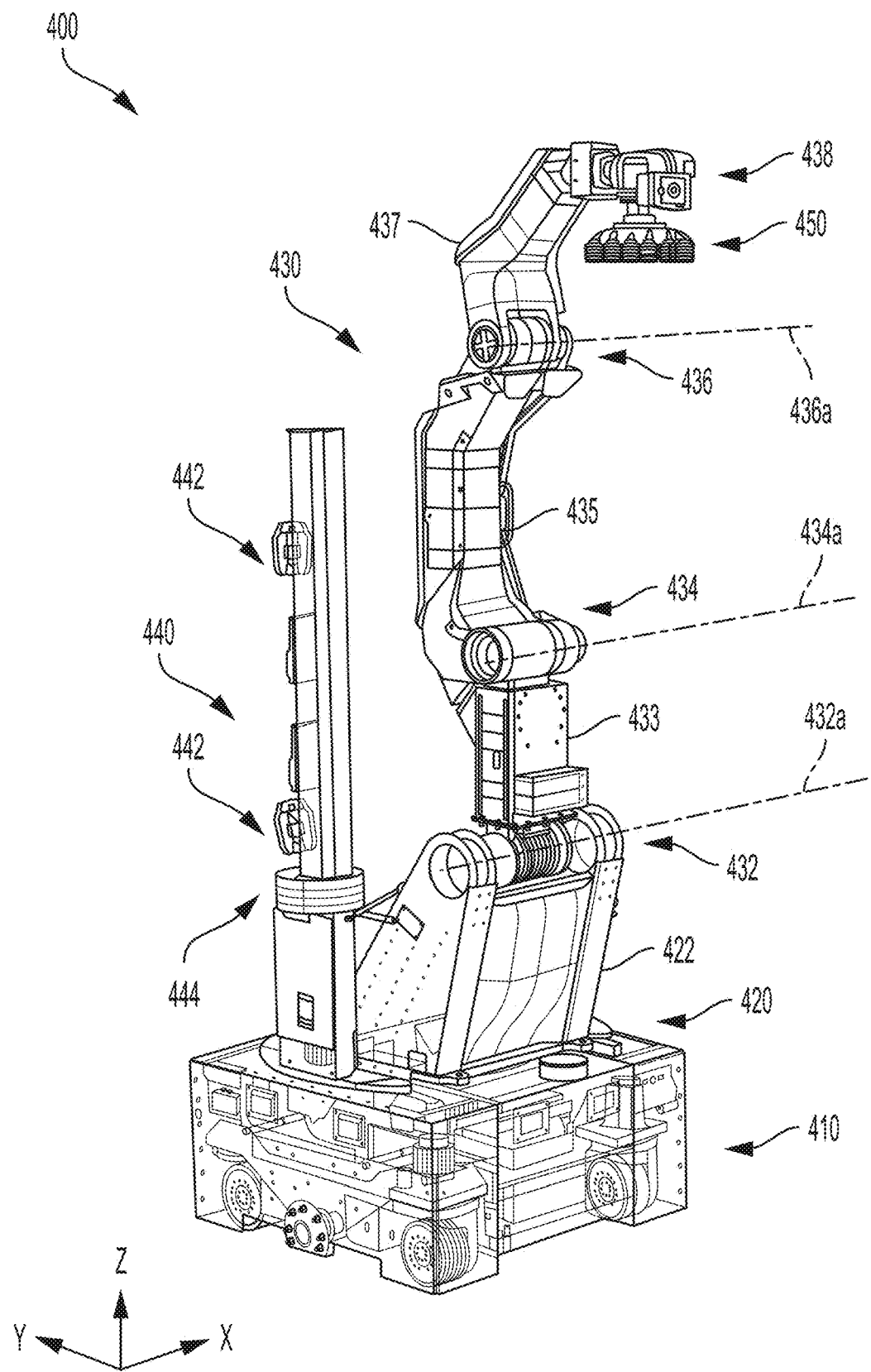
FIG. 3 is a perspective view of a robot, according to an illustrative embodiment of the invention.

FIG. 3 is a perspective view of a robot 400, according to an illustrative embodiment of the invention. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist.

Starting at the turntable 420, the robotic arm 430 includes a turntable offset 422, which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432a, 434a, and 436a, respectively.

The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432a associated with the first joint 432, the second actuator is configured to rotate the second link 435 about the second axis 434a associated with the second joint 434, and the third actuator is configured to rotate the third link 437 about the third axis 436a associated with the third joint 436. In the embodiment shown in FIG. 3, the first, second, and third axes 432a, 434a, and 436a are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. A robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

Figure 4:
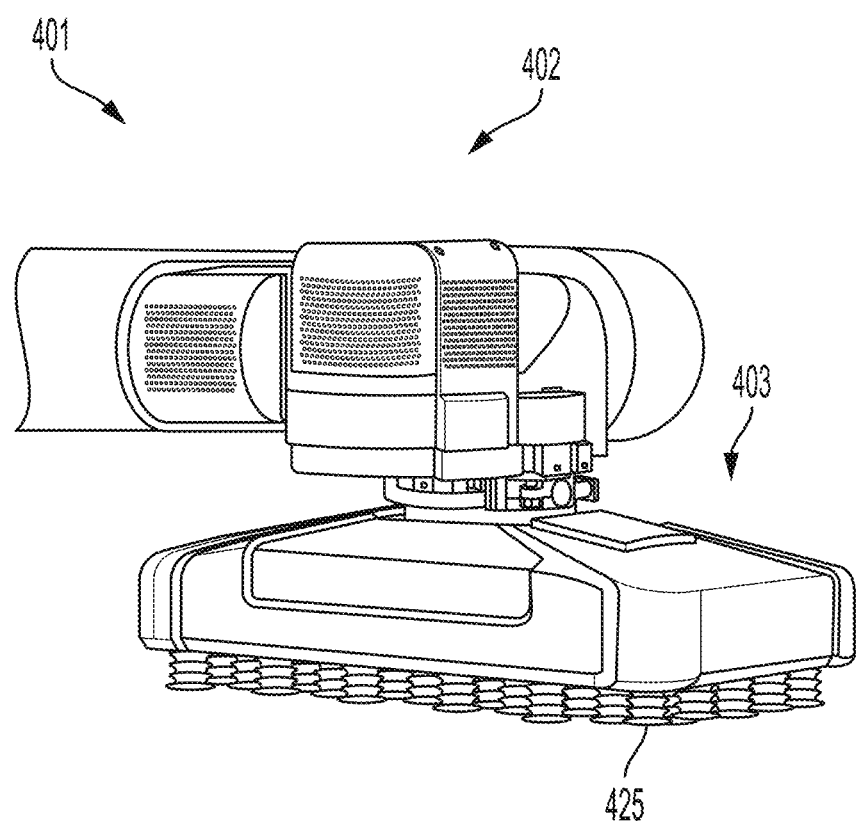
FIG. 4 depicts an end effector of a robot, according to an illustrative embodiment of the invention.

FIG. 4 illustrates an example of a robotic component 401, which corresponds to an end-effector portion of a mobile manipulator robot. Robotic component 401 includes a wrist assembly 402 coupled to an arm of the robot, and a gripper 403 coupled to the wrist assembly 402. Gripper 403 may be configured as a vacuum-based gripper in which suction is applied through a plurality of suction cup assemblies 425 (also referred to herein as "vacuum assemblies") configured to grasp an object (e.g., a box) when suction is applied through them. Each of the suction cup assemblies 425 may include a pressure sensor configured to sense a pressure within the suction cup assembly when suction is applied through the assembly. Pressure signals sensed by the pressure sensors and/or information based on such pressure signals may be provided to a controller to detect suction cup assemblies with poor seals (e.g., leaks), which in turn, may be used by the controller to deactivate and possibly retry activation of the suction cup assemblies in an attempt to improve a grasp quality of the gripper 403, as described herein.

Figure 5:
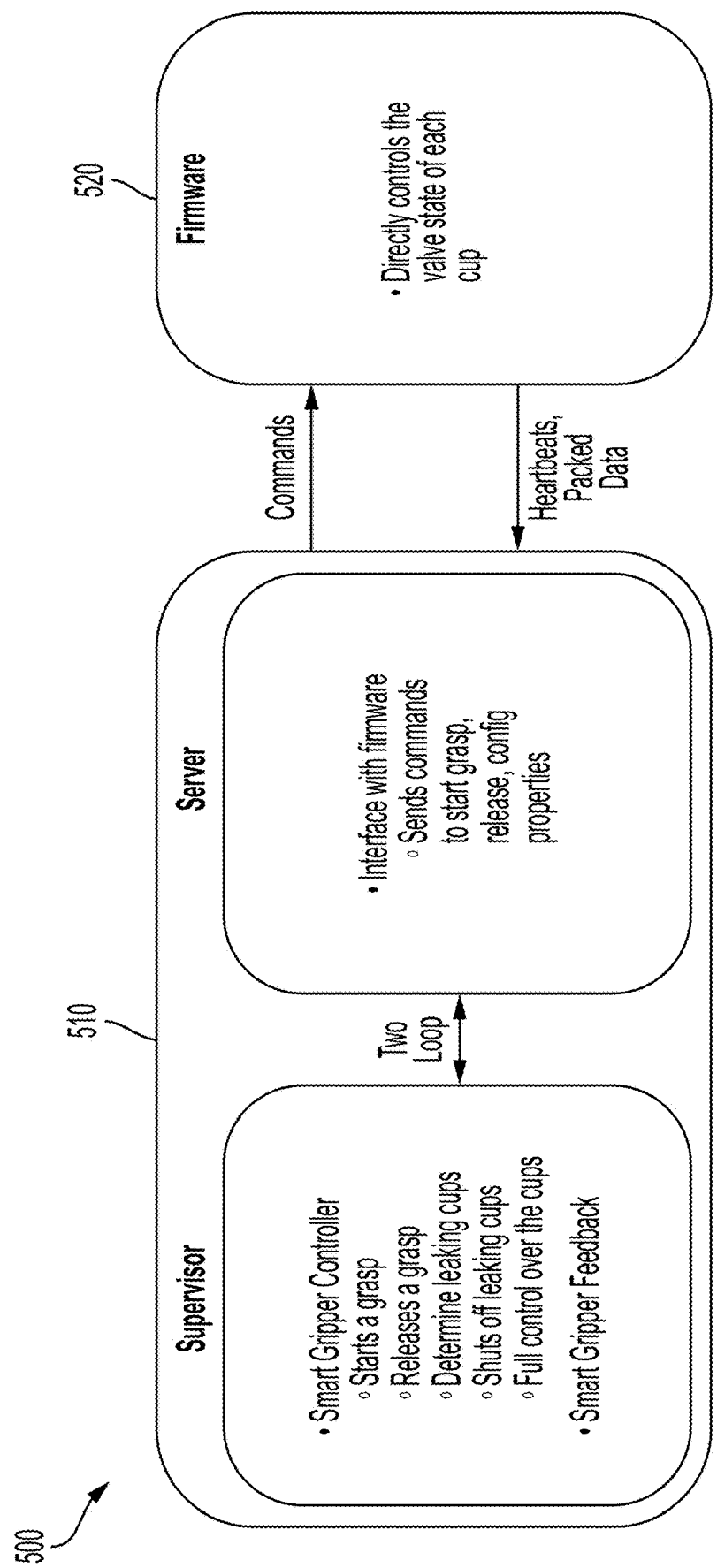
FIG. 5 schematically illustrates a controller architecture configured to control individual cups of a vacuum-based gripper, according to an illustrative embodiment of the invention.

FIG. 5 schematically illustrates a computing architecture 500 that may be used to implement one or more of the techniques described herein. As shown, computing architecture 500 includes a first computing device 510 and a second computing device 520. In some embodiments, first computing device 510 may be implemented as a portion of a controller associated with a mobile robot. The controller may be configured to control the operation of various systems in the robot by, for example, providing control instructions to one or more actuators associated with an arm and/or wrist of the robot to control their movement. In some embodiments, second computing device 520 may be implemented as firmware that translates commands received from the first computing device 510 into control actions on a robot hardware component. In the example system described herein, the second computing device 520 may be implemented as firmware that directly controls the valve states (i.e., activated or deactivated) of individual vacuum assemblies within a gripper of the robot. Second computing device 520 may also receive feedback about the state of the individual vacuum assemblies in the gripper and provide the feedback to the first computing device 510. For instance, pressure sensor signals sensed by a pressure sensor within each of the vacuum assemblies may be provided by second computing device 520 to first computing device 510 to determine vacuum assemblies with poor seal qualities (e.g., due to leaks).

In some embodiments, the first computing device 510 may include multiple components including one or more hardware computing processors programmed to carry out one or more of the methods described herein. In the example shown in FIG. 5, first computing device 510 includes a supervisor processor, configured to control activation/deactivation of the individual cups in the gripper and to process feedback from the gripper. First computing device 510 may also include a server interface component configured to receive information from the supervisor processor and provide control instructions to, and receive feedback information (e.g., vacuum assembly pressures) from, second computing device 520.

Figure 6:
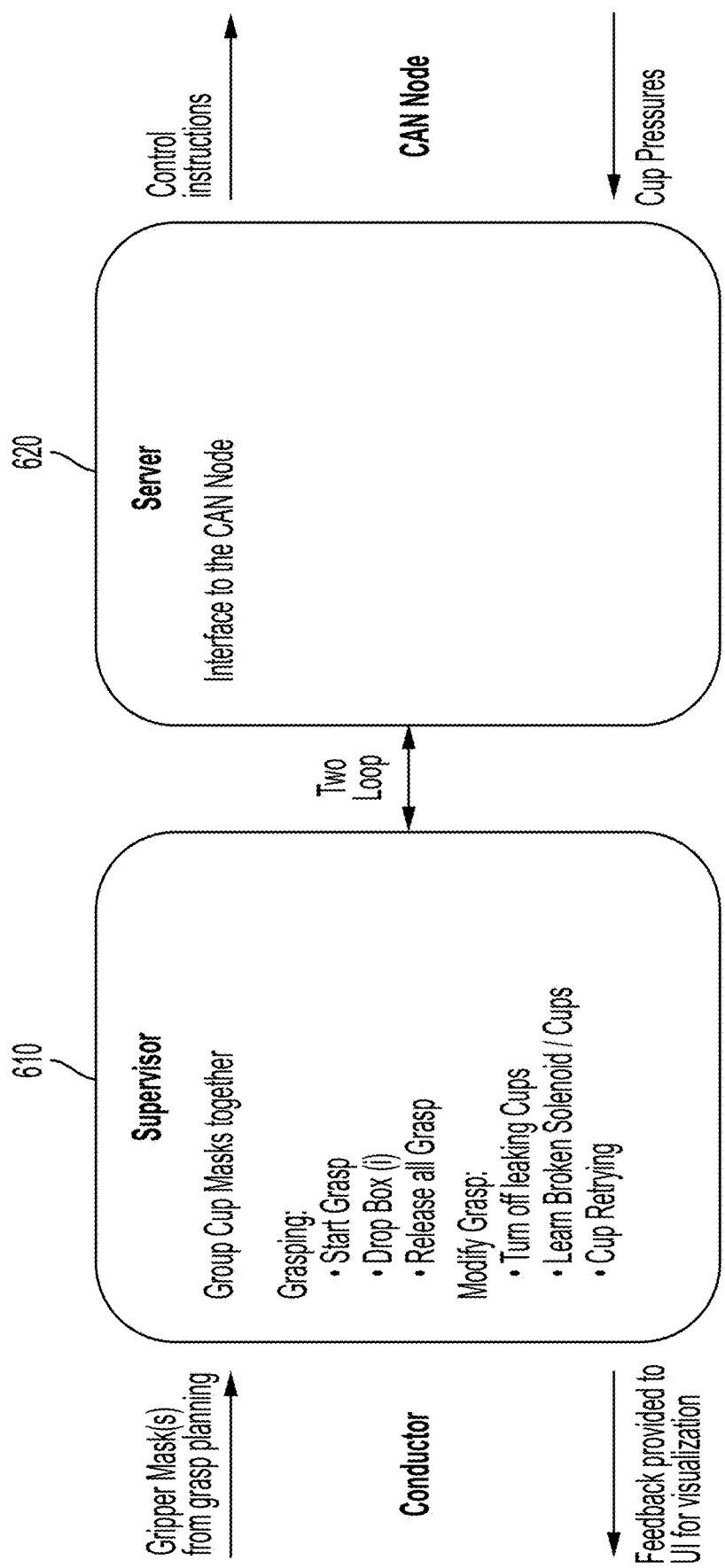
FIG. 6 schematically illustrates functions of processor components of the controller architecture shown in FIG. 5.

FIG. 6 schematically illustrates further details regarding the supervisor processor and server component included in the example first computing device 510 shown in FIG. 5. As shown in FIG. 6, supervisor processor 610 may be configured to receive mask information from a grasp planning process. A gripper of a robot may be configured to grasp multiple objects (e.g., boxes) at the same time by, for example, selectively activating groups of vacuum assemblies, each of the groups being associated with one of the objects. In some embodiments, when a grasp planning process has determined to grasp multiple objects at the same time (also referred to as a "multi-pick" operation), the grasp planning process may provide mask information to the supervisor processor 610. The mask information may describe which suction cups of the gripper should be used to grasp each of the objects. Alternatively, the mask information may describe the size of the multiple objects to be grasped, and the supervisor processor 610 may determine which vacuum assemblies to activate based on the received mask information. By providing the supervisor processor 610 with mask information, the supervisor processor 610 is enabled to make decisions on how to individually control the grasping and releasing of the multiple objects in accordance with the mask information. For instance, as described in more detail below, by controlling sets of vacuum assemblies as a unit based on the mask information, multiple objects simultaneously grasped by a gripper may be released at separate times, which may be advantageous in situations where, for example, boxes picked from a stack in a container such as a truck are being placed by the robot on a conveyor.

As shown in FIG. 6, supervisor processor 610 may be configured to determine grasp operations including, but not limited to, a start grasp operation, a drop object operation, or a release all (e.g., drop all objects) operation. Supervisor processor 610 may further be configured to determine operations to modify a grasp once attempted including, but not limited to, turning off cups with a poor seal quality, identifying and ignoring non-functional cups (e.g., those with broken solenoids or valves), and cup retrying to reactivate cups that were previously deactivated due to poor seal quality. Upon making decisions about how to activate the vacuum assemblies of the gripper, supervisor processor 610 may provide information to server interface 620, which may translate those decisions into control instructions that may be sent to processing software associated with the vacuum assembly hardware (e.g., second computing device 520 shown in FIG. 5). Server interface 620 may also be configured to receive feedback, such as pressure sensor information from the gripper, which may be provided to supervisor processor 610 to facilitate decision making about cup control as described herein.

Figure 7:
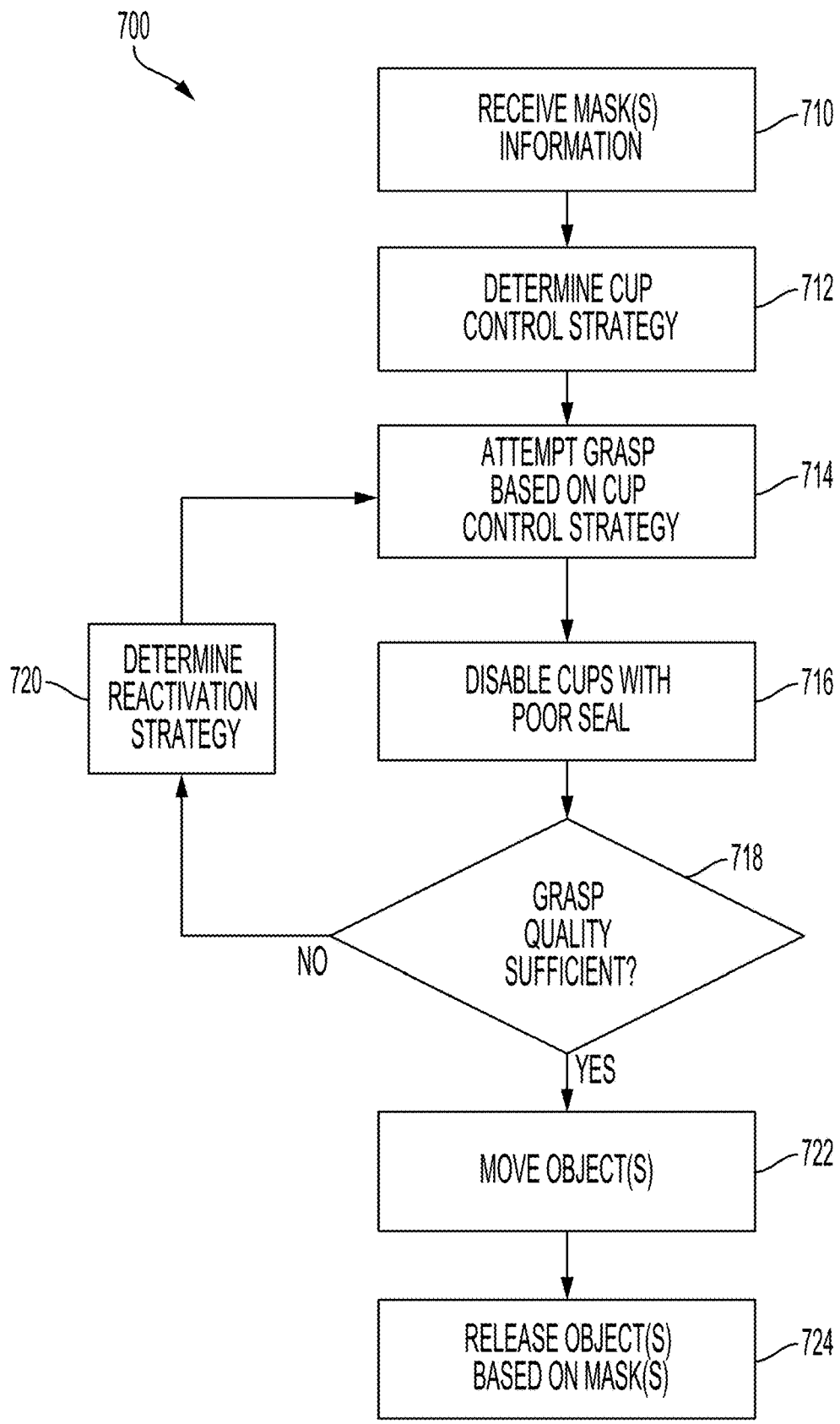
FIG. 7 is a flowchart of a process for controlling individual cups of a vacuum-based gripper of a robot to grasp an object with sufficient grasp quality to move the object, according to an illustrative embodiment of the invention.

FIG. 7 is a flowchart of a process 700 for controlling operation of a gripper of a mobile robot in accordance with some embodiments of the present disclosure. In some embodiments, process 700 may be implemented using the computer architecture 500 illustrated and described in connection with FIGS. 5 and 6. Process 700 begins in act 710, where mask information is received, for example, from a grasp planning process as described above. It should be appreciated that mask information may not be received in all embodiments. For instance, if the robot is not configured to perform multi-picking of objects or if the current grasp is not a multi-pick operation, mask information may not be received and used to determine a cup control strategy. Process 700 then proceeds to act 712, where a cup control strategy is determined. When mask information is received, determining a cup control strategy may involve assigning different vacuum assemblies in the gripper to the different mask layouts specified in the mask information such that grasping/releasing of multiple objects with the gripper can be controlled independently. In embodiments in which mask information is not received, determining a cup control strategy may involve determining to sequentially or simultaneously activate all or a portion of the vacuum assemblies of the gripper to grasp an object in accordance with grasp strategy information provided as input to the cup control strategy process.

Process 700 then proceeds to act 714, where a grasp of one or more objects is attempted based, at least in part, on the cup control strategy determined in act 712. For instance, the cup control strategy may be translated into control commands that are sent to firmware associated with the gripper to activate valves of particular vacuum assemblies of the gripper. Process 700 then proceeds to act 716, where one or more vacuum assemblies having a poor seal quality are disabled or deactivated. By disabling vacuum assemblies with poor seal qualities, the amount of vacuum provided to the other assemblies with good seal quality may be increased to provide a more secure grasp. In some embodiments, the decision about which cups to disable in act 716 may be made in part, based on pressure information received from pressure sensors within individual vacuum assemblies.

Process 700 then proceeds to act 718, where it is determined whether the overall grasp quality is sufficient to move the object(s) with a planned trajectory. If it is determined in act 718 that the grasp quality is not sufficient, process 700 proceeds to act 720, where a strategy for reactivating one or more of the disabled vacuum assemblies is determined. In some embodiments, the reactivation of disabled vacuum assemblies is performed in accordance with one or more rules based on a likelihood that reactivation of particular assemblies is likely to improve the overall grasp quality. An example process for determining a strategy for reactivating disabled vacuum assemblies in accordance with some embodiments is described in connection with FIG. 8. After a strategy for reactivating one or more disabled vacuum assemblies is determined in act 720, process 700 returns to act 714 where the grasp of the gripper is modified by carrying out the reactivation strategy determined in act 720. Acts 716-720 may be repeated until it is determined in act 718 that the grasp quality is sufficient to move the object(s) with the planned trajectory.

When it is determined in act 718 that the grasp quality is sufficient, process 700 proceeds to act 722, where the robot is controlled to move the grasped object from a first location (e.g., a stack of boxes in a truck container) to a second location (e.g., above a conveyor). One or more of the cups of the gripper may lose their quality seal with an object as the moved. In such instances, one or more of the cups with a poor seal may be reactivated mid-motion in an attempt to improve the grasp of the object. Additionally, in some embodiments, information about the grasp quality and/or information about forces on the gripper, wrist or arm of the robot may be used to determine how to move the object through the trajectory from the first location to the second location. For instance, if the weight of a face-picked object is estimated to be 50 lb and it is known that the robot can safely move face-picked objects up to 55 lb, the arm of the robot may be controlled to move the object along the trajectory in act 722 using a slow speed. If however, the weight of the face-picked object is estimated to be 5 lb, the robot may be controlled to move the object along the trajectory in act 722 using a faster (e.g., safe maximum) speed. After the object(s) have been moved to the second location, process 700 proceeds to act 724, where the gripper can be controlled to release the grasped object(s). In the case where a single object is moved, releasing the object may be implemented by disabling the activated vacuum assemblies (e.g., by closing their respective valves). In a scenario where multiple objects are grasped by the gripper, releasing the objects in act 724 may be implemented by selectively disabling subsets of the activated vacuum assemblies (e.g., by closing their respective valves) in accordance with the mask information such that the grasped objects can be individually released at different times.

As discussed above in connection with act 720 of process 700 shown in FIG. 7, in some embodiments of the present disclosure, one or more vacuum assemblies with a poor seal quality can be reactivated in an attempt to improve the grasp of an object by the gripper of the robot. The reactivation may occur at any time while the gripper is interacting with the object including, but not limited to, prior to lifting the object, during movement of the object from a first location to a second location (e.g., during execution of a trajectory), or as another object is being released from the gripper (e.g., in a multi-pick scenario). The inventors have recognized and appreciated that rather than reactivating vacuum assemblies in a prescribed order (e.g., top to bottom, left to right, etc.) or in a random order, it may be advantageous to reactivate disabled vacuum assemblies in an order based on a likelihood that the reactivation will succeed by producing a quality seal with the object.

Figure 8:
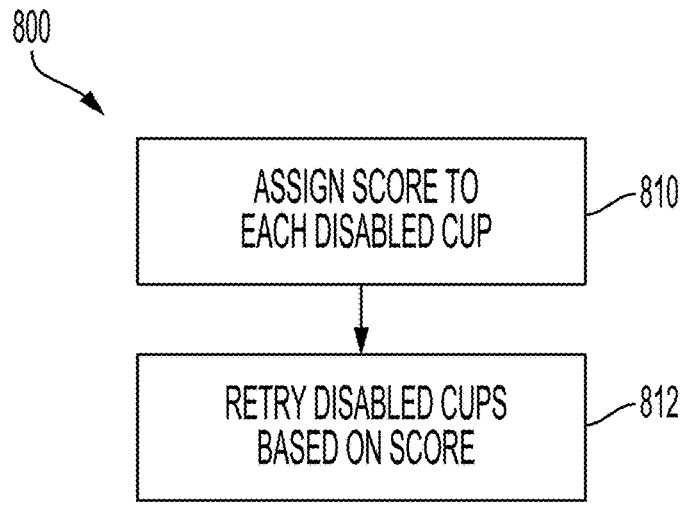
FIG. 8 is a flowchart of a process for determining a reactivation strategy for retrying activation of a plurality of disabled cups of a gripper, according to an illustrative embodiment of the invention.

FIG. 8 is a flow chart of a process 800 for determining a reactivation strategy for disabled vacuum assemblies in accordance with some embodiments of the present disclosure. In act 810, a score may be assigned to each of the disabled vacuum assemblies (also sometimes referred to herein simply as "cups"). The score may be assigned based on one or more characteristics of the disabled vacuum assembly, which may be indicative of the likelihood of reactivation of the assembly succeeding by generating a quality seal with an object. For instance, in some embodiments, disabled vacuum assemblies neighboring activated vacuum assemblies (e.g., cups with quality seals to an object) may be prioritized for reactivation by associating each of the neighboring cups with a higher score. In some embodiments, each of the disabled vacuum assemblies may be associated with a score according to the following formula:

$$\text{Score}=C_0*(\text{\#retry attempts})+C_1*(\text{\#neighboring active}), \text{ where } C_0<0 \text{ and } C_1>0$$

In such instances, cups with more retry attempts and/or fewer neighboring active cups are assigned a lower score compared with cups with fewer retry attempts and/or more neighboring active cups. In some embodiments, cups in which reactivation has failed multiple times may not be included in the scoring process. Rather, such cups may be assumed to be non-working (e.g., due to a broken solenoid/valve) and may not be considered in the reactivation strategy.

In some embodiments, the location of the cup on the gripper may be used to determine how to assign a score for the cup. For example, cups located on an edge of the gripper may be prioritized for reactivation compared to interiorly-located cups. In such an instance, the following formula may be used:

Score=$C_0$*(#retry attempts)+$C_1$*(#neighboring active)+$C_2$*(Edge Cup), where $C_0$<0,$C_1$>0, and $C_2$>0.

Figure 9:
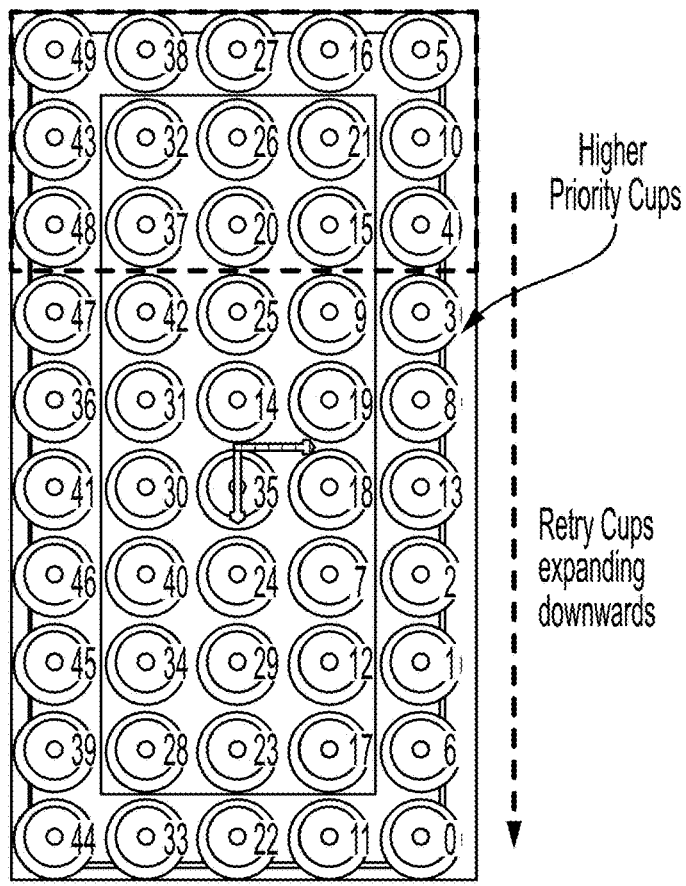
FIG. 9 schematically illustrates how different cups on a gripper may be associated with different priorities for reactivation, according to an illustrative embodiment of the invention.

In this example, when the disabled vacuum assembly is located at an edge of the gripper, its score is increased relative to vacuum assemblies located at gripper locations other than the edge. FIG. 9 schematically illustrates higher priority cups located at the edge of the gripper as a ring of cups located at the outermost border of the gripper.

After assigning a score to each of the disabled cups in act 810, process 800 proceeds to act 812, where the disabled vacuum assemblies are reactivated based, at least in part, on the scores assigned to each of the vacuum assemblies. For instance, cups associated with higher scores may be reactivated prior to attempting reactivation of cups associated with lower scores. In this way, a reactivation order of the disabled cups may be determined based, at least in part, on the assigned scores. FIG. 9 schematically shows a layout of cups of a gripper, with each of the cups being labeled with a number identifying the cup. A "standard" reactivation strategy without scoring may be to reactivate cups from the top of the gripper to the bottom of the gripper, as shown in FIG. 9. Assigning a score to each of the disabled cups as described herein may modify the standard reactivation strategy by prioritizing retrying of cups with higher reactivation scores (e.g., edge cups, cups with more neighboring activated cups, etc.) and ignoring cups that are assumed to be non-functional due to repeated reactivation failures.

Figure 10:
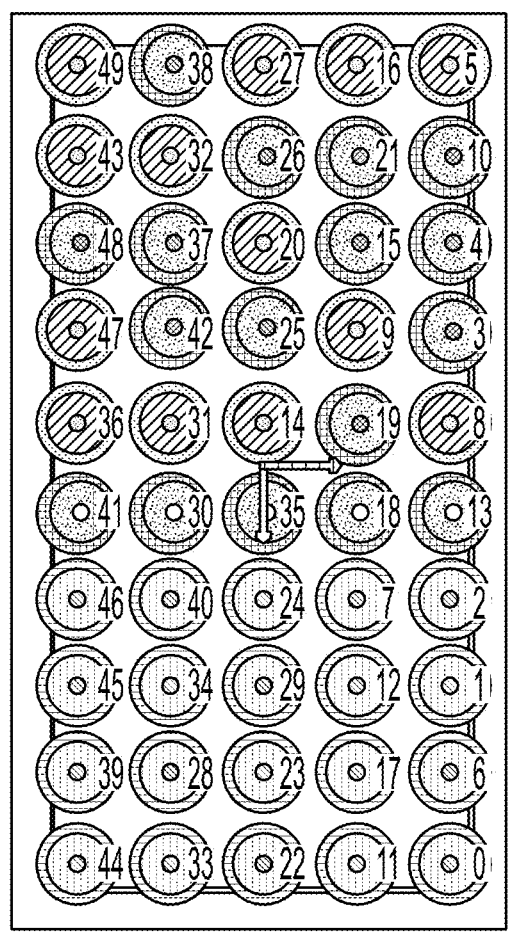
FIG. 10 is a visualization of a layout of cups of a vacuum-based gripper that may be used to convey activation information for each of the plurality of cups, according to an illustrative embodiment of the invention.

In some embodiments, information associated with activation states of the vacuum assemblies in a gripper may be displayed on a user interface to provide an operator of the robot information about activation of the different cups of the gripper. FIG. 10 schematically illustrates an example of a visualization of a gripper for a robot that may include activation state information and may be presented on a user interface in accordance with some embodiments of the present disclosure. In the example of FIG. 10, the visualization uses different colors to identify cups that are currently active, have been retried and are currently disabled, or are turned off. In some embodiments, the visualization may also use different colors to identify which cups are associated with different objects to be grasped (or are currently being grasped) based on mask information, as described herein. Although the example visualization shown in FIG. 10 includes several different colors describing many different types of activation state information, which may be helpful for a skilled operator to understand the full cup behavior of the gripper, it should be appreciated that some embodiments may employ a much simpler visualization. For instance, a visualization that identifies the cups of the gripper determined as non-functional may enable an untrained operator to make simple repairs to the gripper without requiring a highly trained technician to make the repairs. For example, one or more leaky cups may have a deteriorated exterior portion that can be easily replaced by unscrewing the leaky one and screwing in a replacement. Identifying which cups can be easily replaced, may result in less downtime for the robot than if a skilled technician was required to repair the gripper.

In certain situations where an object being grasped by a gripper of a robot comes into contact with another object, it may be advantageous for the robot to drop the object rather than risk damaging the robot. The inventors have also recognized that controlling the gripper to drop an object may be accomplished, in some scenarios, much faster than controlling the arm of the robot to slow down, thereby also mitigating potential robot damage. In some embodiments of the present disclosure, one or more forces associated with the end effector of the robot may be monitored, and an object being grasped by the end effector may be released when it is determined that the monitored force(s) exceed a particular threshold.

Figure 11:
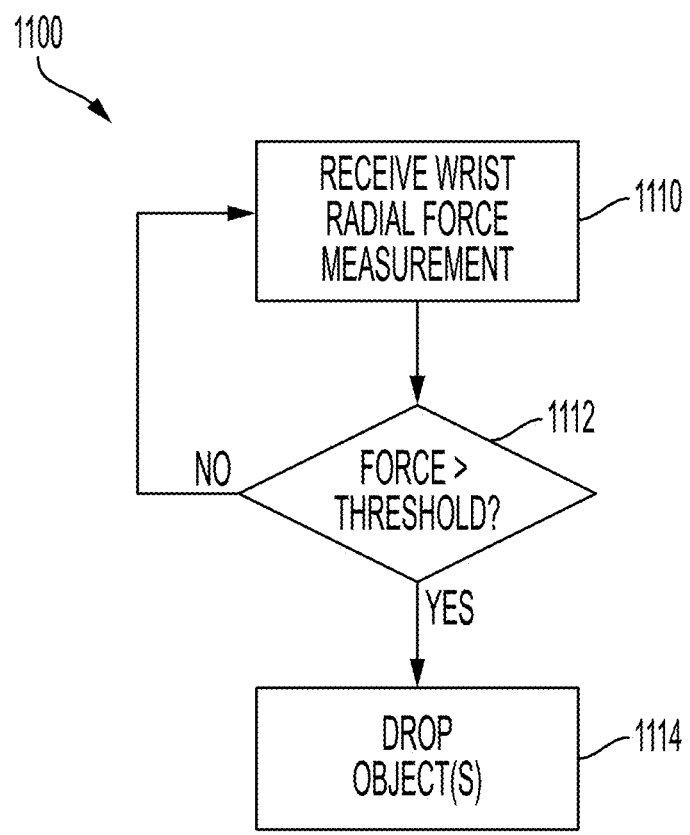
FIG. 11 is a flowchart of a process for determining whether to release a grasped object based on one or more force measurements associated with an end effector of a robot, according to an illustrative embodiment of the invention.

FIG. 11 illustrates a process 1100 for determining whether to release an object from the gripper of a robot in accordance with some embodiments of the present disclosure. Process 1100 begins in act 1110, where a radial force associated with a wrist assembly (e.g., wrist assembly 402 shown in FIG. 4) coupled to the gripper is received. The gripper and/or the wrist assembly may be associated with a force sensor that measures forces in one or more axes of its associated component (e.g., the radial axis of the wrist assembly). Process 1100 then proceeds to act 1112, where it is determined whether the measured force is greater than a threshold value (e.g., 300 N, 400 N, 500 N, 600 N, 700 N, etc.). If it is determined that the measured force is greater than the threshold value, process 1100 proceeds to act 1114, where the object is released from the gripper (e.g., by closing all valves, stopping the vacuum source, or through some other technique). If it is determined that the measured force is less than the threshold value, process 1100 may return to act 1110, where the force on the robotic component continues to be monitored.

Figure 12:
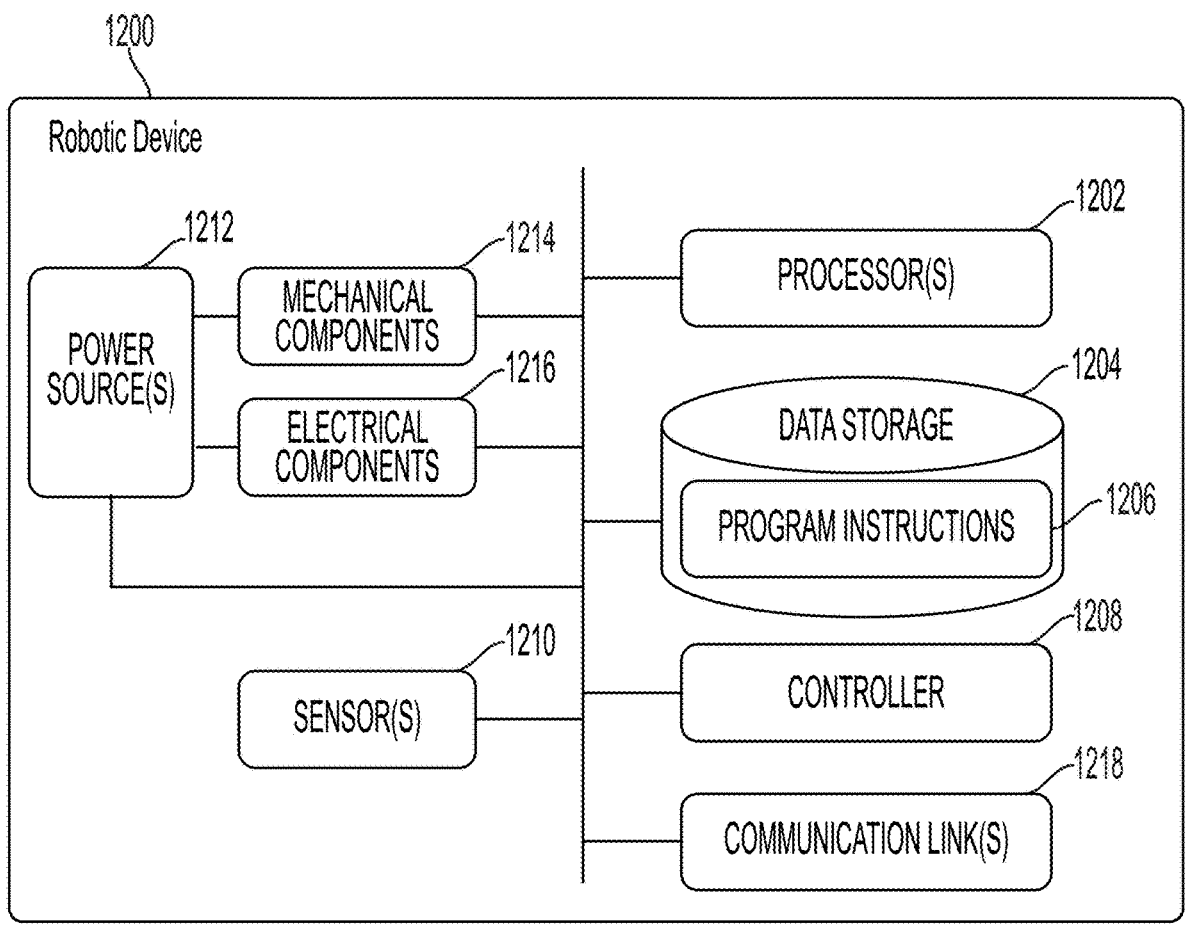
FIG. 12 illustrates an example configuration of a robotic device, according to an illustrative embodiment of the invention.

FIG. 12 illustrates an example configuration of a robotic device 1200, according to an illustrative embodiment of the invention. An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device).

In some implementations, the robotic device may include force sensors that measure or estimate the external forces (e.g., the force applied by a limb of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

FIG. 12 illustrates an example configuration of a robotic device (or "robot") 1200, according to an illustrative embodiment of the invention. The robotic device 1200 represents an example robotic device configured to perform the operations described herein. Additionally, the robotic device 1200 may be configured to operate autonomously, semi-autonomously, and/or using directions provided by user(s), and may exist in various forms, such as a humanoid robot, biped, quadruped, or other mobile robot, among other examples. Furthermore, the robotic device 1200 may also be referred to as a robotic system, mobile robot, or robot, among other designations.

As shown in FIG. 12, the robotic device 1200 includes processor(s) 1202, data storage 1204, program instructions 1206, controller 1208, sensor(s) 1210, power source(s) 1212, mechanical components 1214, and electrical components 1216. The robotic device 1200 is shown for illustration purposes and may include more or fewer components without departing from the scope of the disclosure herein. The various components of robotic device 1200 may be connected in any manner, including via electronic communication means, e.g., wired or wireless connections. Further, in some examples, components of the robotic device 1200 may be positioned on multiple distinct physical entities rather on a single physical entity. Other example illustrations of robotic device 1200 may exist as well.

Processor(s) 1202 may operate as one or more general-purpose processor or special purpose processors (e.g., digital signal processors, application specific integrated circuits, etc.). The processor(s) 1202 can be configured to execute computer-readable program instructions 1206 that are stored in the data storage 1204 and are executable to provide the operations of the robotic device 1200 described herein. For instance, the program instructions 1206 may be executable to provide operations of controller 1208, where the controller 1208 may be configured to cause activation and/or deactivation of the mechanical components 1214 and the electrical components 1216. The processor(s) 1202 may operate and enable the robotic device 1200 to perform various functions, including the functions described herein.

The data storage 1204 may exist as various types of storage media, such as a memory. For example, the data storage 1204 may include or take the form of one or more computer-readable storage media that can be read or accessed by processor(s) 1202. The one or more computer-readable storage media can include volatile and/or non-volatile storage components, such as optical, magnetic, organic or other memory or disc storage, which can be integrated in whole or in part with processor(s) 1202. In some implementations, the data storage 1204 can be implemented using a single physical device (e.g., one optical, magnetic, organic or other memory or disc storage unit), while in other implementations, the data storage 1204 can be implemented using two or more physical devices, which may communicate electronically (e.g., via wired or wireless communication). Further, in addition to the computer-readable program instructions 1206, the data storage 1204 may include additional data such as diagnostic data, among other possibilities.

The robotic device 1200 may include at least one controller 1208, which may interface with the robotic device 1200. The controller 1208 may serve as a link between portions of the robotic device 1200, such as a link between mechanical components 1214 and/or electrical components 1216. In some instances, the controller 1208 may serve as an interface between the robotic device 1200 and another computing device. Furthermore, the controller 1208 may serve as an interface between the robotic device 1200 and a user(s). The controller 1208 may include various components for communicating with the robotic device 1200, including one or more joysticks or buttons, among other features. The controller 1208 may perform other operations for the robotic device 1200 as well. Other examples of controllers may exist as well.

Additionally, the robotic device 1200 includes one or more sensor(s) 1210 such as force sensors, proximity sensors, motion sensors, load sensors, position sensors, touch sensors, depth sensors, ultrasonic range sensors, and/or infrared sensors, among other possibilities. The sensor(s) 1210 may provide sensor data to the processor(s) 1202 to allow for appropriate interaction of the robotic device 1200 with the environment as well as monitoring of operation of the systems of the robotic device 1200. The sensor data may be used in evaluation of various factors for activation and deactivation of mechanical components 1214 and electrical components 1216 by controller 1208 and/or a computing system of the robotic device 1200.

The sensor(s) 1210 may provide information indicative of the environment of the robotic device for the controller 1208 and/or computing system to use to determine operations for the robotic device 1200. For example, the sensor(s) 1210 may capture data corresponding to the terrain of the environment or location of nearby objects, which may assist with environment recognition and navigation, etc. In an example configuration, the robotic device 1200 may include a sensor system that may include a camera, RADAR, LIDAR, time-of-flight camera, global positioning system (GPS) transceiver, and/or other sensors for capturing information of the environment of the robotic device 1200. The sensor(s) 1210 may monitor the environment in real-time and detect obstacles, elements of the terrain, weather conditions, temperature, and/or other parameters of the environment for the robotic device 1200.

Further, the robotic device 1200 may include other sensor(s) 1210 configured to receive information indicative of the state of the robotic device 1200, including sensor(s) 1210 that may monitor the state of the various components of the robotic device 1200. The sensor(s) 1210 may measure activity of systems of the robotic device 1200 and receive information based on the operation of the various features of the robotic device 1200, such the operation of extendable legs, arms, or other mechanical and/or electrical features of the robotic device 1200. The sensor data provided by the sensors may enable the computing system of the robotic device 1200 to determine errors in operation as well as monitor overall functioning of components of the robotic device 1200.

For example, the computing system may use sensor data to determine the stability of the robotic device 1200 during operations as well as measurements related to power levels, communication activities, components that require repair, among other information. As an example configuration, the robotic device 1200 may include gyroscope(s), accelerometer(s), and/or other possible sensors to provide sensor data relating to the state of operation of the robotic device. Further, sensor(s) 1210 may also monitor the current state of a function that the robotic device 1200 may currently be operating. Additionally, the sensor(s) 1210 may measure a distance between a given robotic limb of a robotic device and a center of mass of the robotic device. Other example uses for the sensor(s) 1210 may exist as well.

Additionally, the robotic device 1200 may also include one or more power source(s) 1212 configured to supply power to various components of the robotic device 1200. Among possible power systems, the robotic device 1200 may include a hydraulic system, electrical system, batteries, and/or other types of power systems. As an example illustration, the robotic device 1200 may include one or more batteries configured to provide power to components via a wired and/or wireless connection. Within examples, components of the mechanical components 1214 and electrical components 1216 may each connect to a different power source or may be powered by the same power source. Components of the robotic device 1200 may connect to multiple power sources as well.

Within example configurations, any type of power source may be used to power the robotic device 1200, such as a gasoline and/or electric engine. Further, the power source(s) 1212 may charge using various types of charging, such as wired connections to an outside power source, wireless charging, combustion, or other examples. Other configurations may also be possible. Additionally, the robotic device 1200 may include a hydraulic system configured to provide power to the mechanical components 1214 using fluid power. Components of the robotic device 1200 may operate based on hydraulic fluid being transmitted throughout the hydraulic system to various hydraulic motors and hydraulic cylinders, for example. The hydraulic system of the robotic device 1200 may transfer a large amount of power through small tubes, flexible hoses, or other links between components of the robotic device 1200. Other power sources may be included within the robotic device 1200.

Mechanical components 1214 can represent hardware of the robotic device 1200 that may enable the robotic device 1200 to operate and perform physical functions. As a few examples, the robotic device 1200 may include actuator(s), extendable leg(s), arm(s), wheel(s), one or multiple structured bodies for housing the computing system or other components, and/or other mechanical components. The mechanical components 1214 may depend on the design of the robotic device 1200 and may also be based on the functions and/or tasks the robotic device 1200 may be configured to perform. As such, depending on the operation and functions of the robotic device 1200, different mechanical components 1214 may be available for the robotic device 1200 to utilize. In some examples, the robotic device 1200 may be configured to add and/or remove mechanical components 1214, which may involve assistance from a user and/or other robotic device.

The electrical components 1216 may include various components capable of processing, transferring, providing electrical charge or electric signals, for example. Among possible examples, the electrical components 1216 may include electrical wires, circuitry, and/or wireless communication transmitters and receivers to enable operations of the robotic device 1200. The electrical components 1216 may interwork with the mechanical components 1214 to enable the robotic device 1200 to perform various operations. The electrical components 1216 may be configured to provide power from the power source(s) 1212 to the various mechanical components 1214, for example. Further, the robotic device 1200 may include electric motors. Other examples of electrical components 1216 may exist as well.

In some implementations, the robotic device 1200 may also include communication link(s) 1218 configured to send and/or receive information. The communication link(s) 1218 may transmit data indicating the state of the various components of the robotic device 1200. For example, information read in by sensor(s) 1210 may be transmitted via the communication link(s) 1218 to a separate device. Other diagnostic information indicating the integrity or health of the power source(s) 1212, mechanical components 1214, electrical components 1216, processor(s) 1202, data storage 1204, and/or controller 1208 may be transmitted via the communication link(s) 1218 to an external communication device.

In some implementations, the robotic device 1200 may receive information at the communication link(s) 1218 that is processed by the processor(s) 1202. The received information may indicate data that is accessible by the processor(s) 1202 during execution of the program instructions 1206, for example. Further, the received information may change aspects of the controller 1208 that may affect the behavior of the mechanical components 1214 or the electrical components 1216. In some cases, the received information indicates a query requesting a particular piece of information (e.g., the operational state of one or more of the components of the robotic device 1200), and the processor(s) 1202 may subsequently transmit that particular piece of information back out the communication link(s) 1218.

In some cases, the communication link(s) 1218 include a wired connection. The robotic device 1200 may include one or more ports to interface the communication link(s) 1218 to an external device. The communication link(s) 1218 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

A number of implementations have been described. Nevertheless, it will be understood that various modifications may be made without departing from the spirit and scope of the disclosure.

The invention claimed is:

1. A method, comprising:
activating a plurality of vacuum assemblies of a robotic gripper to grasp one or more objects;
disabling one or more of the plurality of vacuum assemblies having a seal quality with the one or more objects that is less than a first threshold;
assigning a score to each of the one or more disabled vacuum assemblies;
reactivating the one or more disabled vacuum assemblies in an order based, at least in part, on the assigned scores; and
grasping the one or more objects with the robotic gripper when a grasp quality of the robotic gripper is higher than a second threshold.

2. The method of claim 1, further comprising:
receiving mask information associating different vacuum assemblies of the robotic gripper to different objects to be grasped,
wherein activating the plurality of vacuum assemblies comprises activating the plurality of vacuum assemblies based, at least in part, on the mask information.

3. The method of claim 2, wherein
the one or more objects includes a first object and a second object, and
the mask information associates a first set of vacuum assemblies with the first object and a second set of vacuum assemblies with the second object,
the method further comprising:
releasing the first object by selectively deactivating the vacuum assemblies in the first set of vacuum assemblies;
waiting for an amount of time; and
releasing the second object by selectively deactivating the vacuum assemblies in the second set of vacuum assemblies.

4. The method of claim 1, wherein assigning a score to each of the one or more disabled vacuum assemblies comprises assigning a score based, at least in part, on a location of the vacuum assembly in the robotic gripper.

5. The method of claim 4, wherein assigning a score to each of the one or more disabled vacuum assemblies comprises assigning a score based, at least in part, on a number of neighboring active vacuum assemblies.

6. The method of claim 4, wherein assigning a score to each of the one or more disabled vacuum assemblies comprises assigning a score based, at least in part, on whether the vacuum assembly is located at an edge of the robotic gripper.

7. The method of claim 1, wherein assigning a score to each of the one or more disabled vacuum assemblies comprises assigning a score based, at least in part, on a number of retry attempts for the vacuum assembly.

8. The method of claim 1, further comprising:
receiving force information associated with the robotic gripper; and
releasing the one or more objects in response to determining that the force information is greater than a third threshold.

9. The method of claim 8, wherein the force information includes radial force information experienced by a wrist assembly coupled to the robotic gripper.

10. The method of claim 1, further comprising:
determining that a first set of vacuum assemblies are non-functional, wherein the first set includes one or more vacuum assemblies, and
wherein reactivating the one or more disabled vacuum assemblies is performed only for vacuum assemblies not included in the first set.

11. The method of claim 10, further comprising:
displaying on a user interface, an indication of the vacuum assemblies included in the first set.

12. The method of claim 10, wherein determining that a first set of vacuum assemblies are non-functional comprises:
activating a first vacuum assembly of the plurality of vacuum assemblies;
measuring a pressure level within the first vacuum assembly when activated; and
including the first vacuum assembly in the first set when the measured pressure level is less than a third threshold.

13. A controller for a robotic gripper, the controller comprising:
at least one computer processor programmed to:
activate a plurality of vacuum assemblies of a robotic gripper to grasp one or more objects;
disable one or more of the plurality of vacuum assemblies having a seal quality with the one or more objects that is less than a first threshold;
assign a score to each of the one or more disabled vacuum assemblies;
reactivate the one or more disabled vacuum assemblies in an order based, at least in part, on the assigned scores; and
grasp the one or more objects with the robotic gripper when a grasp quality of the robotic gripper is higher than a second threshold.

14. The controller of claim 13, wherein the at least one computer processor is further programmed to:
receive mask information associating different vacuum assemblies of the robotic gripper to different objects to be grasped, and
wherein activating the plurality of vacuum assemblies comprises activating the plurality of vacuum assemblies based, at least in part, on the mask information.

15. The controller of claim 14, wherein
the one or more objects includes a first object and a second object, and
the mask information associates a first set of vacuum assemblies with the first object and a second set of vacuum assemblies with the second object, and the at least one computer processor is further programmed to:
release the first object by selectively deactivating the vacuum assemblies in the first set of vacuum assemblies;
wait for an amount of time; and
release the second object by selectively deactivating the vacuum assemblies in the second set of vacuum assemblies.

16. The controller of claim 13, wherein assigning a score to each of the one or more disabled vacuum assemblies comprises assigning a score based, at least in part, on one or more of:
a location of the vacuum assembly in the robotic gripper,
a number of neighboring active vacuum assemblies, or
a number of retry attempt for the vacuum assembly.

17. The controller of claim 13, wherein the at least one computer processor is further programmed to:
receive force information associated with the robotic gripper; and
release the one or more objects in response to determining that the force information is greater than a third threshold.

18. The controller of claim 13, wherein the at least one computer processor is further programmed to:
determine that a first set of vacuum assemblies are non-functional, wherein the first set includes one or more vacuum assemblies, and
wherein reactivating the one or more disabled vacuum assemblies is performed only for vacuum assemblies not included in the first set.

19. The controller of claim 18, wherein determining that a first set of vacuum assemblies are non-functional comprises:
activating a first vacuum assembly of the plurality of vacuum assemblies;
measuring a pressure level within the first vacuum assembly when activated; and
including the first vacuum assembly in the first set when the measured pressure level is less than a third threshold.

20. A mobile robotic device, comprising:
a robotic gripper comprising a plurality of vacuum assemblies and at least one pressure sensor associated with each vacuum assembly of the plurality of vacuum assemblies; and
at least one computer processor programmed to:
activate the plurality of vacuum assemblies of the robotic gripper to grasp one or more objects;
disable one or more of the plurality of vacuum assemblies having a seal quality with the one or more objects that is less than a first threshold;
assign a score to each of the one or more disabled vacuum assemblies;
reactivate the one or more disabled vacuum assemblies in an order based, at least in part, on the assigned scores; and
grasp the one or more objects with the robotic gripper when a grasp quality of the robotic gripper is higher than a second threshold.

* * * * *